United States Patent [19]
Ojima et al.

[11] Patent Number: 5,785,493
[45] Date of Patent: Jul. 28, 1998

[54] TURBOCHARGER FOR INTERNAL COMBUSTION ENGINE

[75] Inventors: Kazuo Ojima; Tatsuhiko Oshino, both of Hitachinaka, Japan

[73] Assignee: Hitachi, Ltd. and Hitachi Car Engineering Co., Ltd., Germany

[21] Appl. No.: 771,147

[22] Filed: Dec. 20, 1996

[30] Foreign Application Priority Data

Dec. 20, 1995 [JP] Japan .................. 7-331490

[51] Int. Cl.⁶ .................................................. F04D 29/18
[52] U.S. Cl. .................. 415/174.1; 415/173.1; 415/200
[58] Field of Search .................. 415/200, 173.1, 415/173.2, 174.1, 182.1

[56] References Cited

FOREIGN PATENT DOCUMENTS

| | | |
|---|---|---|
| 50-690 | 1/1975 | Japan . |
| 52-72335 | 6/1977 | Japan . |
| 52-85031 | 7/1977 | Japan . |
| 4-40559 | 7/1992 | Japan . |
| 6-307250 | 1/1994 | Japan . |

*Primary Examiner*—John Kwon
*Attorney, Agent, or Firm*—Evenson, McKeown, Edwards & Lenahan, P.L.L.C.

[57] ABSTRACT

A turbocharger for an internal combustion engine, for improving the turbocharger efficiency by manufacturing a compressor housing by a non-expensive method excellent in productivity, has a structure that a housing wall member located on an inner periphery of a compressor housing metal portion and facing to a curved profile portion of a compressor impeller is separately formed by, for example, PPS resin-forming, and integrally held and secured by a screw member engaging with a screw hole provided in the housing metal portion.

13 Claims, 4 Drawing Sheets

TURBOCHARGER FOR INTERNAL COMBUSTION ENGINE

BACKGROUND OF THE INVENTION

1. Field of the Invention

The present invention relates to a turbocharger for an internal combustion engine, and more particularly, to an improvement of a compressor housing thereof.

2. Description of the Related Art

A turbocharger for an internal combustion engine receives exhaust gas from an engine exhaust pipe, rotationally drives a turbine wheel in a turbine housing, compresses air within a compressor housing under the action of rotation of compressor impellers arranged via a drive shaft integrally formed with the turbine wheel, and supplies the compressed air to the engine. The compressor housing and the compressor impeller in the turbocharger as described above are generally made of aluminum alloy castings.

An engine with a turbocharger is now demanded to have a supercharging effect from a low-revolution region of the engine. In the turbocharger, making an outside diameter of a curved profile portion of the compressor impeller and a gap formed between the profile portion and the inner wall surface of the compressor housing corresponding thereto as small as possible while improving a blade-shape of the compressor impeller is favorable for improving efficiency of the compressor. However, the small gap involves a risk that the curved profile portion of the compressor impeller rotating at an extra-high velocity may come into contact with the inner wall surface of the compressor housing due to slight shaft vibration, resulting in breakage of the impeller, or further in destruction of the drive shaft.

In a conventional turbocharger, therefore, it has been the usual practice to provide a gap of from about 0.3 mm to 0.5 mm between the inner wall surface of the compressor housing and the curved profile portion of the compressor impeller.

Making the gap between the impeller and the housing as small as possible by a thermal-spray coating provided in the housing is already known, for example, for a gas turbine (as disclosed in JP-B2-50-690, JP-A52-72335, and JP-A-52-85031). More recently, JP-B2-04-40559 proposes a method of, in a turbocharger for automobile, forming by thermal spray a resin coating comprising a mixture of soft metal and resin or graphite onto the inner wall surface of a compressor housing as a means of making the above gap small and preventing occurrence of a damage to the compressor impeller even upon contact with the compressor impeller.

As a means of making the gap between the compressor impeller and the housing in a turbocharger of an internal combustion engine small, and preventing occurrence of a damage to the impeller even upon contact with the compressor impeller, JP-A-06-307250 proposes a turbocharger in which a wall member separately formed from a composite material comprising a resin such as PTFE (polytetrafluoroethylene) or a mixture of the resin and graphite or glass wool is attached onto a wall surface of at least the portion of the compressor housing wall surface corresponding to a curved profile portion of the compressor impeller.

In the conventional art, the presence of a necessary minimum gap T within a range of from 0.3 to 0.5 mm between the curved profile portion of the compressor impeller and the inner wall surface of the compressor housing puts restriction on improvement of compressor efficiency.

A thermal spray coating technique recently proposed, on the other hand, while being effective for improving compressor efficiency, needs making a consideration in productivity with respect to thermal spray equipment, capability to handle many different types of compressors and masking of products, and thus the problem is that a product cost is higher.

Even when the thermal spray coating technique is replaced by a technique for improving compressor efficiency, in which a separately formed resin member is attached to the wall surface and a gap between the compressor housing inner wall surface and the curved profile portion of the compressor impeller of a turbocharger is made small, it is important to rotate the compressor impeller at extra-high velocity without damaging the compressor impeller upon contact between the wall member and the compressor impeller. That is, it is important, upon contact of these members, to smoothly shave the compressor housing wall member without causing any damage such as deformation or breakage to the compressor impeller.

SUMMARY OF THE INVENTION

The present invention has an object to provide a turbocharger in which the wall surface member is made of a resin member excellent in machinability for allowing contact with the compressor impeller in extra-high velocity rotation so as to minimize the gap between the inner wall surface and the curved profile portion of the compressor impeller, thereby improving compressor efficiency, as well as causing no risk of damage to the compressor impeller even upon contact of these members, by a low-cost technique excellent in productivity. In the present invention, furthermore, the material of the wall member is taken into consideration so that, even when the wall member is shaven by a contact with the compressor impeller and the shaven chips reach the cylinder, there would be no bad effect on the engine cylinder.

In order to achieve the above object, the present invention is characterized in that a resin wall member which is located on an inner periphery of a metal member of a compressor housing and is correspondingly to a curved profile portion of a compressor impeller is made of PPS (polyphenylene sulfide). More specifically, the foregoing wall member is tightened and fixed by means of connecting bolts engaged with screw holes formed in the foregoing compressor housing. Further, a slight gap defined by the inner periphery of the wall member and the shape of the curved profile portion in the outer periphery of the compressor impeller is set so that the gap on the inlet side of the compressor impeller is larger than that on the outlet side of the compressor impeller.

In the present invention, furthermore, taking account of expansion of the wall member, the contact portion between the compressor housing and the wall member is limited to only the attachment surface, and gaps are provided between these members without the above contact portion.

In the present invention having the construction as described above, the wall member made of PPS resin or a composite material comprising a mixture of PPS resin and graphite or glass wool provided correspondingly to the curved profile portion of the compressor impeller is shaven away without damaging the compressor impeller upon contact of the curved profile portion of the compressor impeller with the wall member attached to the compressor housing, because the wall member is made of a material softer than that of the metal composing the compressor impeller.

The gap between the curved profile portion of the compressor impeller and the wall member provided correspondingly thereto can therefore be set to a value closer to zero than the value of the gap of from 0.3 mm to 0.5 mm required in the conventional art. Particularly during extra-high velocity rotation of the compressor impeller, i.e., during temperature rise caused by adiabatic compression on the compressor side, the foregoing gap can be set to perfectly zero in consideration of thermal expansion of the wall member. In the present invention, for example, even upon occurrence of contact between the compressor impeller and the wall member attached to the compressor housing as a result of shaft vibration, the wall member attached to the compressor housing is shaven in response to the extent of contact, thus maintaining the gap of zero.

This means that the gap of from 0.3 mm to 0.5 mm existent between the inner wall of the compressor housing and the compressor impeller in the conventional art can be adjusted substantially to zero, thus resulting in an improved compressor efficiency.

The wall member attached to the compressor housing can be resin-formed in a mold or the like, and then incorporated in the compressor housing (metal member), and the wall member thus made of a resin can be shaven with the compressor impeller during preliminary operation such as during confirmation of fluid performance. A similar result is available by incorporating a resin-formed wall member into the compressor housing (metal member), previously cutting the wall member so that the gap becomes null upon thermal expansion in the actual operating state (during extra-high velocity operation), incorporating the compressor impeller and rotationally driving the same. Further, the wall member may be forcedly shaven with the compressor impeller during actual operation without previously applying cutting or other working.

Various methods are conceivable, taking account of productivity, for integrally forming the wall member of the compressor housing and the compressor housing (metal portion). For integration of a resin member and the metal member, it is possible to attach the resin member to the metal member of the compressor housing with the use of a metal member insert mold or the like. A wall member made of a PPS resin excellent in heat resistance, oil resistance and chemical resistance can be screw-connected directly with the compressor housing (metal member). A further improved productivity is available by achieving such a construction. In this case, it is desirable to provide a gap for allowing expansion of the wall member for portions other than the contact surface of these members.

DESCRIPTION OF THE PREFERRED EMBODIMENTS

Figure 1:
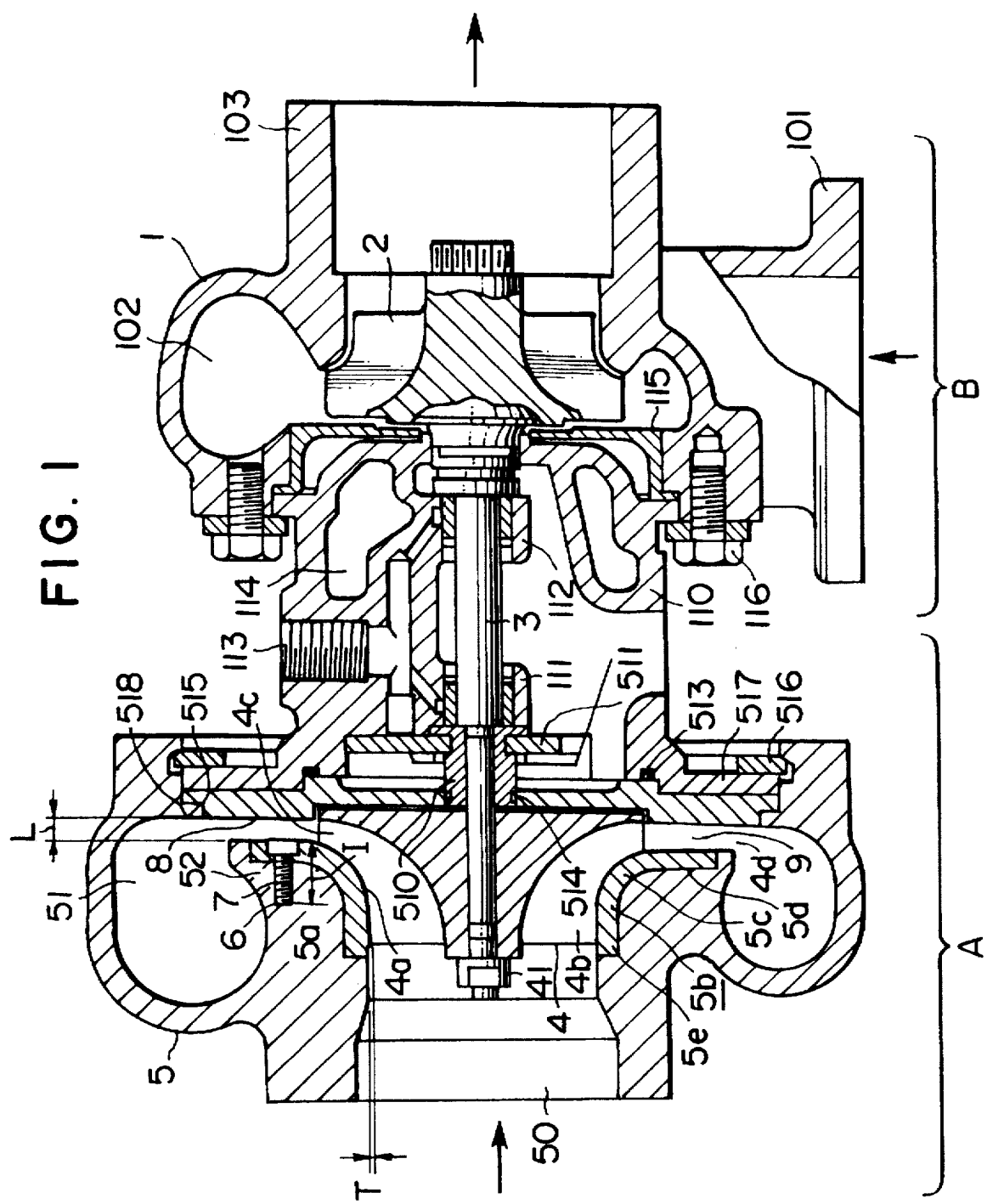
FIG. 1 is a sectional view illustrating an embodiment of a turbocharger for an internal combustion engine according to the present invention.

FIG. 1 is a sectional view illustrating a turbocharger for automobile, in which a portion A represents a compressor portion and B, a turbine portion.

Exhaust gas from an internal combustion engine for automobile is introduced from an inlet 101 of a turbine housing into a scroll 102, flows from a larger cross-section toward a narrower cross-section, and is discharged from an outlet 103 into an exhaust pipe. At this point, a turbine impeller 2 is rotated at a high velocity (at least 100,000 rpm) under the effect of energy of exhaust gas.

A drive shaft 3 of this turbine is bearing-connected to a bearing housing 110 through bearings 111 and 112.

The bearing housing 110 is further provided with a lubricant path 113 for supplying lubricant to the bearings and a cooling water path 114 for circulating cooling water for the engine to cool the turbocharger.

The turbine portion B is assembled by attaching a shroud 115 onto a side of the bearing housing 110, then inserting the drive shaft 3 through the bearings 111 and 112, securing a turbine wheel 2 to an end of this drive shaft 3, and screw-fixing the same to the bearing housing 110 with screws 116 so as to cover the outer side with a turbine housing 1.

Upon rotation of the drive shaft 3 by rotation of the turbine wheel 2, a compressor impeller 4 attached to the other end of the drive shaft 3 rotates in the compressor housing 5, compresses air sucked from an inlet 50 of the compressor housing 5 with the compressor impeller 4, and discharges compressed air to a scroll 51, which is then pumped to an intake manifold of the internal combustion engine.

The compressor portion A is assembled by pressure-inserting a sleeve 510 with a thrust metal 511 from the opposite turbine side of the drive shaft 3 into the drive shaft 3.

Then, a seal ring 513 is engaged with grooves provided on an end face of the bearing housing 110 on the opposite turbine side, and another seal ring 514 is attached to the outer periphery of the sleeve 510. A seal plate 8 is then attached so as to come into contact with these rings.

Then, a compressor impeller 4 is inserted into the drive shaft 3, and the drive shaft 3 and the compressor impeller 4 are secured with a screw 41 at the tip of the drive shaft 3.

Finally, the compressor impeller 4 is covered from outside with the compressor housing 5, engaged with a spigot 515 on the outer periphery of the seal plate 8. A portion of the seal plate 8 composing this spigot 515 and a flange 517 for attaching the compressor formed in the bearing housing 110 are inserted and secured between an annular portion of the compressor housing and a C-ring 516 attached in a groove formed on the compressor housing 5.

Although the main body of the compressor housing 5 is made of aluminum alloy castings, a wall member 5b made of a resin is integrated with the portion facing the curved profile portion 4a of the compressor impeller 4 after assembly. The wall member 5b is made by resin-forming of a PPS (polyphenylene sulfide) resin or a composite mixture of a PPS resin and graphite or glass fiber softer than the compressor impeller 4.

The wall member 5b is directly connected and secured to the main body of the housing 5 with screw members 7 engaging with holes 6 provided on a flat annular surface 52 facing the seal plate 8 of the main body of the compressor housing 5 on an annular surface 5d at right angles to the drive shaft 3 of the compressor impeller 4.

Further, the wall member 5b comprises a cylinder portion 5e extending in parallel with the drive shaft 3, and a curved portion 5c connecting the cylinder portion 5e and the annular surface 5d.

Figure 2:
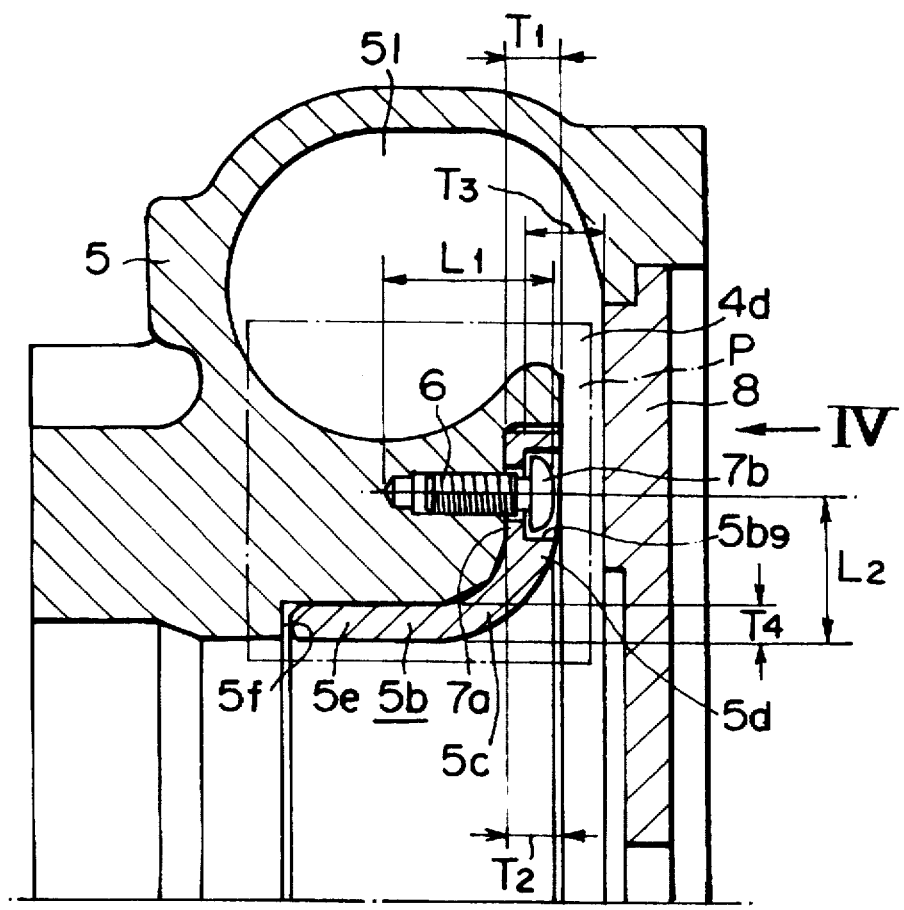
FIG. 2 is a partially enlarged view of the compressor A shown in FIG. 1.

FIG. 2 is a sectional view illustrating only the compressor housing 5.

Figure 3:
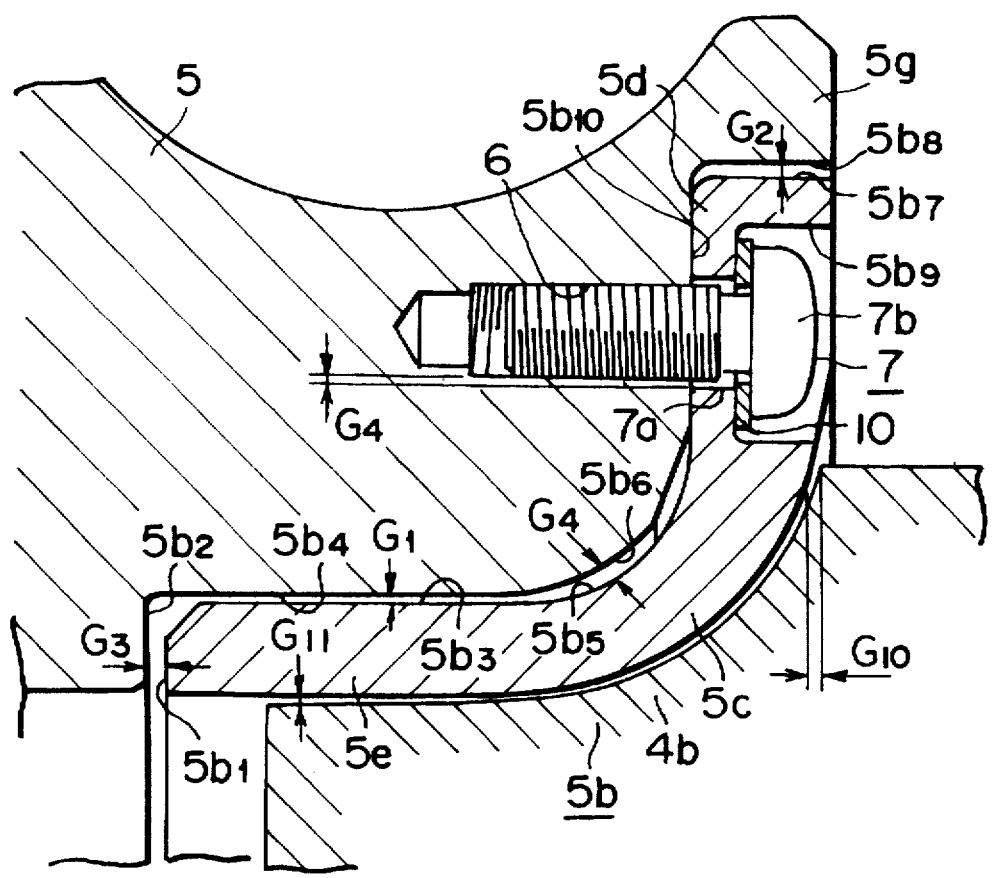
FIG. 3 is a partially enlarged view of a portion P shown in FIG. 2.

FIG. 3 is an enlarged view of the portion D delimited with a one-point chain line in FIG. 2.

Figure 4:
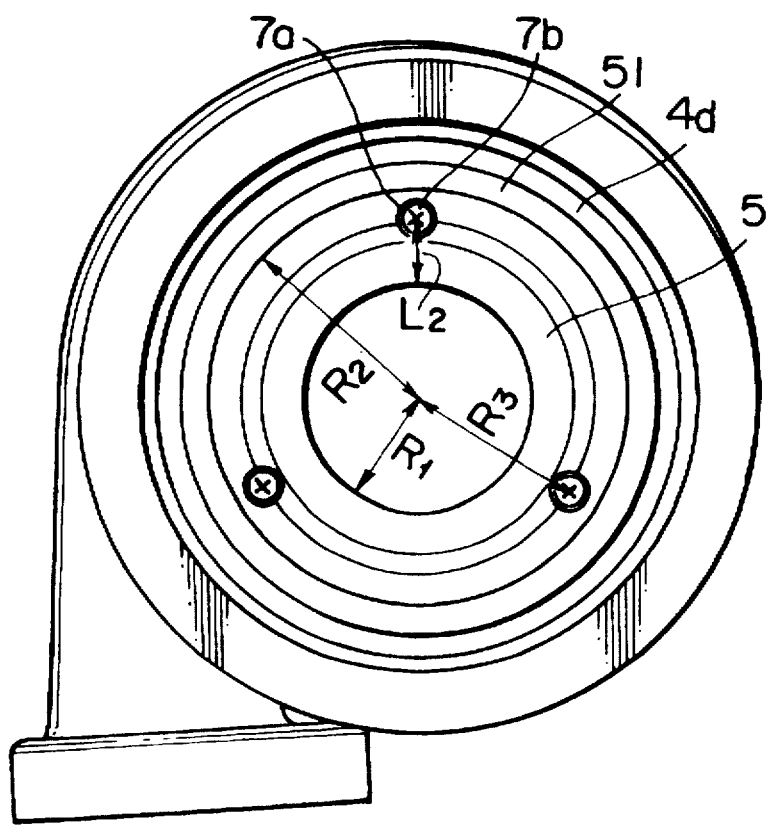
FIG. 4 is a reduced fragmentary view taken in the direction of the arrow Q of FIG. 2.

FIG. 4 is another representation of FIG. 2 as viewed in the arrow Q direction in a reduced scale.

The relationship between the compressor housing 5 and the peripheral members will be described further in detail below with reference to these drawings.

A recess 5f is formed in the portion of the compressor housing 5, which faces the curved profile portion of the compressor impeller 4. This recess 5f comprises an annular portion facing the seal plate 8 for receiving the wall member 5b, a cylinder portion along the drive shaft and a portion having the curved surface portion connecting these portions.

The wall member 5b attached to this recess 5f serves as the wall surface of the compressor housing 5 facing the curved profile 4a of a plurality of compressor blades 4b forming the compressor impeller 4.

The compression efficiency of the compressor is higher according as a gap T between the housing wall surface and the profile of the impeller is smaller. In this embodiment, this gap T is designed to become substantially zero during usual operation by the use of thermal expansion of the wall member 5b on the basis of the principle of the present invention.

For the wall member 5b, the size $R_1$ from the center to the inside diameter of the cylinder portion, the size $R_2$ to the outside diameter thereof, and the size $R_3$ to the center of the screw hole 7a are determined from a forming mold, thus determining the size $L_2$ between the center of the screw hole and the inside diameter of the cylinder portion.

The screw hole 7a is provided through the center of an accommodation recess 5bg of the screw top 7b of the screws 7 provided on the same circle periphery.

The wall member 5b is in contact only on the housing-side surface $5b_{10}$ of the annular surface on which the screw hole 7a is formed, and forms an attachment surface.

As shown in FIG. 4, gaps $G_1$ to $G_4$ are formed between the other wall surfaces of the wall member attachment recess of the compressor housing 5 and the corresponding wall member.

At the room temperature, the gap $G_3$ between the axial end face 5bl of the cylinder portion 5e of the wall member 5b and the wall surface $5b_2$ of the corresponding recess is set to about 300 to 400 μm, the gap $G_1$ between the surface $5b_3$ of the cylinder portion 5e of the wall member 5b and the corresponding wall surface $5b_4$, about 250 μm, the gap $G_4$ between the surface $5b_5$ of the curved portion 5c thereof and the corresponding wall surface $5b_6$, 500 to 600 μm, and the gap $G_2$ between the outer periphery edge $5b_7$ of the annular surface portion 5d of the wall member 5b and the corresponding wall surface $5b_8$, 300 to 400 μm as in the gap $G_3$.

PPS has a thermal expansion coefficient of 2 to $7\times10^{-5}$ (1 to $6\times10^{-5}$ when glass is contained). These values of gaps are therefore based on an extent of expansion at about the thermal deformation temperature of 250° C. so that the wall member 5b, even when expanding toward the housing 5, does not come into contact with the recess wall surface of the housing. Or, when the wall member comes into pressure contact with the recess wall surface of the housing as a result of expansion, the reaction thereof may cause cracks or rupture in the wall member 5b.

Because impact stress resulting from contact with the compressor impeller 4b concentrates on the curved portion 5c of the wall member 5b, the thickness thereof is designed to become gradually larger from the cylinder portion 5e toward the annular surface 5d. That is, the thickness $T_4$ of the cylinder portion is larger than thickness $T_2$ of the annular surface portion.

The top 7b of the screw 7, designed to perfectly fit in the accommodation recess 5bg, never projects to the surface facing the seal plate 8 of the compressor housing 5, so as not to cause resistance to the flow of air therethrough.

The depth $T_1$ of the recess 5f and the thickness $T_2$ of the wall member 5b are designed to ensure sinking of the wall member 5b into the recess 5f by a depth within a range of from 100 to 200 μm at the room temperature so that the seal plate 8 side end face 5g of the metal portion of the compressor housing 5 and the seal plate 8 side end face of the annular surface portion 5d of the wall member 5b become substantially flush upon ordinary operation.

The screw 7 is designed to have a longitudinal length $L_1$ longer than the distance $T_3$ between the end face of the seal plate 8 and the bottom surface of the screw accommodation recess of the wall member 5b, so that the screw 7 does not come off the screw hole 7a even when it loosens.

Furthermore, even when the loosening screw 7 jumps out to the seal plate 8 side to tilt on the impeller 4 side, the strong flow of air during rotation of the impeller 4 pushes out the screw 7 which thus never comes into contact with the impeller 4.

The surface of the wall member 5 facing the impeller may previously be shaven and then assembled so that the gap T from the impeller becomes null as a result of thermal expansion at about the ordinary operating temperature. In this example, however, the impeller itself was provided with the shaving function.

More specifically, it was designed so that the gap T between the surface of the wall member 5b and the compressor impeller 4 became null upon assembly, and the molded wall member 5b without any working was incorporated into the compressor housing 5. A test similar to the rotation test carried out without fail before assembly into the automobile was conducted, and the surface of the wall member 5b was shaven by means of the compressor impeller 4 into a desired shape.

In the rotation test, revolutions of the compressor impeller 4 was increased up to about 160,000 rpm on the maximum. Cutting traces of from 0.03 to 0.05 mm remained on the surface of the wall member 5b. The cutting traces were shallower on the inlet side than on the outlet side of the compressor. The results of some tests taking account of manufacturing errors of the individual parts suggested that a design to bring the initial gap T to zero caused cutting traces of from 0.05 to 0.15 mm.

Another fact found in these tests is that the wall member 5b made of a resin thermally expands under the effect of temperature increase of the compressor housing resulting from adiabatic compression of air during compressor operation. The foregoing cutting traces naturally include those coming from this thermal expansion.

The design values of the wall members 5b were therefore modified into values taking account of the foregoing two points (non-uniformity between outlet and inlet sides and thermal expansion coefficient).

That is, the thermal expansion coefficient was calculated in an anticipation of temperature increase from the room temperature to 80° C., and design was made with a radius $R_1$ larger by a value corresponding to this expansion.

Design was made also so that the radius was smaller on the outlet side than on the inlet side of the compressor.

In this example, a slight gap T is produced between the surface of the wall member 5b and the compressor impeller 4, and this gap T was slightly smaller on the outlet side than on the inlet side.

A similar rotation test carried out on the compressor of this example resulted in only a cutting trace of about 0.02 mm in a part on the outlet side of the compressor exit.

The same compressor after this initial cutting was subjected to several similar rotation tests, and no increase in cutting traces was observed.

The results of tests carried out on various materials of the wall member 5b are shown in Table 1.

low temperatures, so that the compressor can be operated at a high efficiency.

When using PTFE (polytetrafluoroethylene), a very high viscosity resulted in production of chamfer, leading to a deformation of the impeller.

Although polytetrafluoroethylene alone poses some difficulties in practice, deposition of a hard PPS on the surface of a substrate made of this polytetrafluoroethylene gives a wall member provided with advantages of the both materials. In this case, the impact alleviating effect of polytetrafluoroethylene can be expected.

When using a no-mixing material of PBT (polybutylene terephthalate), the deformation temperature is low, resulting

TABLE 1

| | Material | | | |
|---|---|---|---|---|
| Item | PPS Polyphenylenesulfide No mixing | PPS Polyphenylenesulfide Glass-reinforced | PTFE Polytetrafluoroethylent | PBT Polybutylene terephthalate No mixing |
| Interference with impeller | | | | |
| Machinability in interference | ⊚ | ○ | X | Δ |
| Damage to impeller | No deformation, no wear | Worn | Deformed | Worn |
| Hardness (D785) | 90–100 | 90–100 | 58 | 80–90 |
| Deformation at high temperature | ○ (medium) | ⊚ (little) | ○ | Δ (large) |
| Thermal deformation temperature (Test method: D785) | 250° C. or over | 250° C. or over | 50° C. or over | 220° C. or over |
| Continuous service temperature (Test method: UL746B) | 210° C. or over | 210° C. or over | 250° C. or over | 140° C. or over |
| Linear expansion coefficient × 10$^{-5}$ (test method: UL746B) | 2–7 | 1–6 | 10–17 | 2–5 |
| Over-all judgement | ⊚ | ○ | X | Δ |

The turbocharger shown in Table 1 had previously been subjected to a rotation test similar to that with a compressor having a wall member of the above-mentioned PPS and initially shaven, and was continuously operated at a continuous service temperature shown in Table 1. "Deformation at a high temperature" in Table 1 shows the result thereof.

The wall member made of PPS (no mixing) was shavable by the impeller because the material was relatively brittle, with no deformation nor wear in the impeller. The thermal deformation temperature was at least 250° C. or over, and the continuous operation at 210° C. did not give a large amount of deformation.

When using a glass-reinforced PPS mixing PPS with graphite or glass wool, the linear expansion coefficient is reduced by 70 to 50%. While the overall hardness was almost the same as in the PPS material, there was observed a slight trace of wear on the impeller, attributable to the contact between the mixture and the impeller. The amount of deformation upon temperature increase is led to a smaller value corresponding to the decrease in the linear expansion coefficient, which is superior to those of the others.

This means that the gap T between the wall member and the impeller does not fluctuate much at all temperatures ranging from the room temperature to high temperatures. Even when designing so as to achieve a gap T of null at high temperatures, the gap T does not widen so much at relatively low temperatures.

in serious deformation at high temperatures, and the long period of time of contact between the impeller and the wall caused wear of the impeller.

However, if a mixed material suitable for this PBT is available, it would show the same tendency as the glass-reinforced PPS, and can be used in practice.

The judging symbols ○, x and Δ do not represent in or outside the scope of the present invention, but shows easiness of practical application at the present level of art for practical application, and a low rating does not mean exclusion from the scope of the present invention.

It was confirmed that PPS had satisfactory affinity to engine lubricant and gasoline, and shaven chips, if coming into cylinders, did not exert any adverse effect on the engine.

Damage to the wall member caused by deviated contact or strong tightening of the screw 7 was prevented by placing a plain washer 10 between the screw member 7 and the bottom surface of the screw accommodation recess.

The gaps provided at portions other than the attachment portion of the wall member 5b served also to adjust expansion deformation of the wall member 5b toward the impeller into an appropriate amount. Without these gaps, all expansion toward the metal housing would appear on the impeller side. In addition, this may cause deformation of, or damage to, the wall member itself.

Furthermore, as shown in FIG. 4, the wall member is secured in the axial direction by three screws.

Since this limits axial thermal deformation to an amount corresponding to thickness $T_1$ of the wall member made of a resin, there is only a slight amount of deformation.

In the radial direction, on the other hand, a thermal deformation corresponding to the size $L_2$ of the resin wall member with the securing screw as reference, is led to a larger amount of deformation as compared with that in the axial direction.

To avoid this inconvenience, imbalance in the amount of deformation is absorbed by making the gap between the resin wall member and the compressor impeller larger for the radial direction $G_{11}$ than that for the axial direction $G_{10}$.

Because performance of a compressor mainly depends upon the gap in the axial direction, possibility to reduce the clearance in the axial direction is favorable for achieving higher performance.

According to the present invention, as described above, the surface of the compressor housing facing the impeller is formed into a separate piece from a PPS resin, which is assembled into the housing, and the gap between the two members is brought substantially to zero by the use of thermal expansion of the resin in ordinary operation.

Because of these features of the invention, a turbocharger of an internal combustion engine provided with a compressor having a high efficiency is available by a relatively simple process.

More specifically, the features are as follows. Portions other than the attachment surface of the wall member can be arranged with a gap so as not to come into contact with the compressor housing itself. This permits elimination of excessive deformation, crack or breakage caused by thermal expansion.

Provision of a stopper for attachment screw permits prevention of damage to the engine caused by falling of a screw.

What is claimed is:

1. A turbocharger for an internal combustion engine, in which a compressor housing has at least a wall portion attached and secured thereto so as to face a compressor impeller and separately formed of a material softer than a material for said compressor impeller, wherein said compressor housing and said wall member are partially closely in contact at the attachment surface such that gaps for allowing thermal expansion of said wall member are provided between said wall member and said compressor housing except at said attachment surface.

2. A turbocharger for an internal combustion engine according to claim 1, wherein said wall member comprises a cylindrical surface along a drive shaft of said compressor impeller, an annular surface at right angles thereto, and a curved surface connecting these two surfaces.

3. A turbocharger for an internal combustion engine according to claim 2, wherein the annular surface of said wall member forms an attachment surface in close contact with said compressor housing.

4. A turbocharger for an internal combustion engine according to claim 2, wherein said wall member and said compressor housing are screw-secured by a screw member which runs through the annular surface of said wall member and reaches said compressor housing.

5. A turbocharger for an internal combustion engine according to claim 4, wherein the screw securing portion of said compressor housing and the wall member is formed at a portion located further outside a maximum outside diameter of said compressor impeller.

6. A turbocharger for an internal combustion engine according to claim 4, wherein a recess for accommodating a screw head of said screw member is formed in the annular portion of said wall member.

7. A turbocharger for an internal combustion engine according to claim 2, wherein said wall member is engaged with a recess provided on the surface of said compressor housing.

8. A turbocharger for an internal combustion engine according to claim 7, wherein the annular surface of said wall member is attached to said compressor housing in close contact, and a peripheral edge of this annular portion faces to a part of the wall of the recess in said compressor housing with a gap in between.

9. A turbocharger for an internal combustion engine according to claim 7, wherein an axial end face of said wall member and a part of wall of the recess of said compressor housing face each other with a gap therebetween.

10. A turbocharger for an internal combustion engine according to claim 7, wherein a peripheral surface of the cylinder portion of said wall member and the following surface of the curved portion face to a part of a wall surface of the recess of said compressor housing with a gap therebetween.

11. A turbocharger for an internal combustion engine according to claim 1, wherein a recess is formed on the surface of said compressor housing; said wall member is fitted into said recess; this recess of the wall member has an annular connecting surface along a plane at right angles to a drive shaft of said compressor impeller; the both members are mutually secured at this portion; a gap is present between said wall member and the compressor housing surface at the curved portion and the following cylindrical surface along said compressor impeller; further, a peripheral edge surface of the annular surface of said wall member faces an inner peripheral surface of the recess of said compressor housing with a gap in between; and further, an end face in the axial direction of the cylindrical portion of said wall member faces an end wall in the axial direction of the recess of said compressor housing with a gas in between.

12. A turbocharger for an internal combustion engine according to claim 1, wherein said wall member is made of a resin material having a thermal expansion coefficient smaller than that of PTFE (polytetrafluoroethylene).

13. A turbocharger for an internal combustion engine according to claim 1, wherein an expansion coefficient of the wall member is set so that the gap between said wall member and said compressor impeller is relatively large at the room temperature of the turbocharger, and becomes substantially zero at high temperatures during operation.

* * * * *